United States Patent

Coppo

[19]

[11] Patent Number: 6,000,655
[45] Date of Patent: Dec. 14, 1999

[54] CLUTCH HOUSING FOR A SEAT BELT PRETENSIONER

[75] Inventor: Fulvio Coppo, Piossasco, Italy

[73] Assignee: Breed Automotive Technology, Inc., Lakeland, Fla.

[21] Appl. No.: 09/182,913

[22] Filed: Oct. 30, 1998

[30] Foreign Application Priority Data

Nov. 18, 1997 [GB] United Kingdom .................. 9724385

[51] Int. Cl.[6] .......................... B65H 75/48; B60R 22/34
[52] U.S. Cl. ......................... 242/374; 280/807; 297/476
[58] Field of Search ........................ 242/374; 280/806, 280/807; 297/477, 478, 476

[56] References Cited

U.S. PATENT DOCUMENTS 4,932,603   6/1990   Yamani et al. ......................... 242/107
5,284,307   2/1994   Kotama ................................. 242/374

FOREIGN PATENT DOCUMENTS 2250419   6/1992   United Kingdom .
2262700   6/1993   United Kingdom .

*Primary Examiner*—John Q. Nguyen
*Attorney, Agent, or Firm*—L. Drayer; B. Vrioni

[57] ABSTRACT

A pretensioner clutch housing for a vehicle seat belt arrangement has a housing made of a first housing part arranged to mount a clutch, and a second housing part arranged to mount a pre-tensioning device. The first and second housing parts have cooperating members for connecting the parts together. The cooperating members preferably are a flange on one part and a slot on the other. The clutch housing part is thus universal and only the pretensioner housing part needs to be changed to alter the angle of extension of a tube containing a pretensioner's piston to facilitate different models of cars.

1 Claim, 5 Drawing Sheets

CLUTCH HOUSING FOR A SEAT BELT PRETENSIONER

FIELD OF THE INVENTION

This invention relates to seat belt retractors of the type having a pretensioner, and in particular to a housing for a pretensioner clutch.

BACKGROUND OF THE INVENTION

A pretensioner commonly has a piston mounted in a tube which is mechanically or electrically activated to pretension the seat belt by winding in the belt spool a predetermined amount upon the detection of a predetermined deceleration rate of the vehicle, which indicates a crash situation. The piston may be connected to one end of an actuator cable, the other end of which is connected to the belt spool via a clutch mechanism. Thus when the piston is activated, the cable is retracted, and the clutch engaged so as to wind in the belt spool. This may be achieved for example by the cable being wound around an annular member mounted on the axle of the spool so as to surround the axle, which annular member decreases in diameter when the cable is tightened so as to grip the spool axle, such that the axle then rotates with the annular member to wind in the belt.

The tube carrying the piston normally has an outer cover and is mounted on an upper part of the clutch housing. Some applications require that the tube extend from the clutch housing at a different angle, for example in order to fit different vehicles. It is therefore necessary to provide clutch housings with different configurations. This necessitates the provision of a new clutch housing tool for manufacturing the housing. Usually, clutch housings are required in left hand and right hand versions, for use on opposite sides of a vehicle, adding further to the cost and inconvenience of providing different housings.

SUMMARY OF THE INVENTION

According to the present invention, there is provided a pretensioner clutch housing for a vehicle seat belt arrangement comprising a belt spool, a pre-tensioning device, and a clutch arranged for connecting the belt spool to the pre-tensioning device, the housing comprising a separate housing part arranged to mount the clutch, and a second housing part arranged to mount the pre-tensioning device, the first and second housing parts comprising cooperating members for connecting the parts together.

Preferably the cooperating members comprise a slot or groove on one part and a flange, slidable into the slot or groove, on the other part, but various arrangements are contemplated such as threaded fasteners, bolts or clip-on arrangements.

Since the pretensioner is mounted in this second separate housing part, this part can be interchangeable depending upon the required angle of extension of the pretensioner tube, while the clutch housing part remains the same. The clutch housing is a major part of the arrangement and its manufacture requires a more expensive tool, so the invention represents a substantial cost saving in production terms.

BRIEF DESCRIPTION OF THE DRAWINGS

The invention will now be described which reference to the accompanying drawing, in which.

DETAILED DESCRIPTION OF THE INVENTION

Figures 1A, 1B:
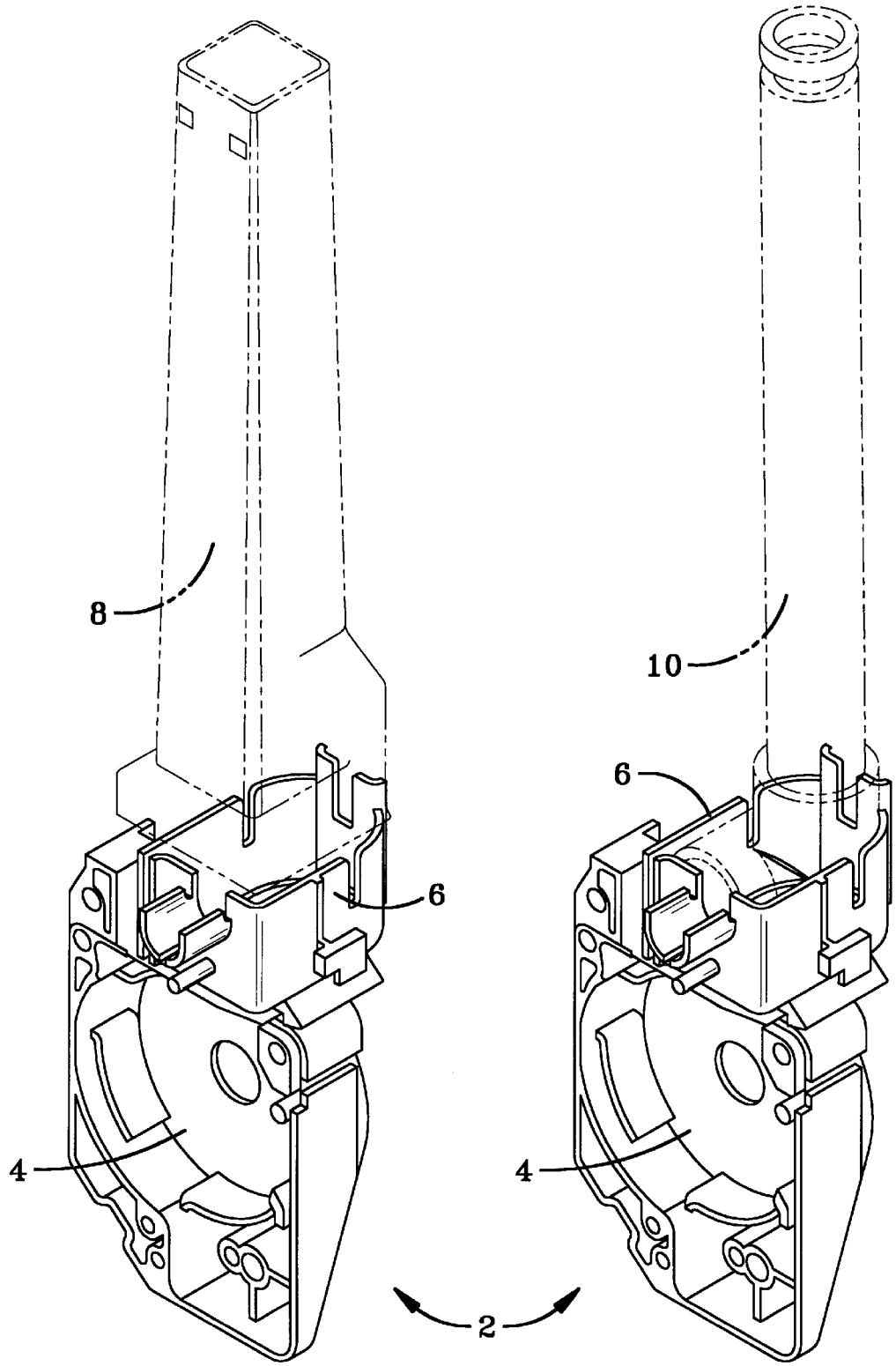
FIGS. 1A and 1B show clutch housings according to the prior art.
Figure 2A:
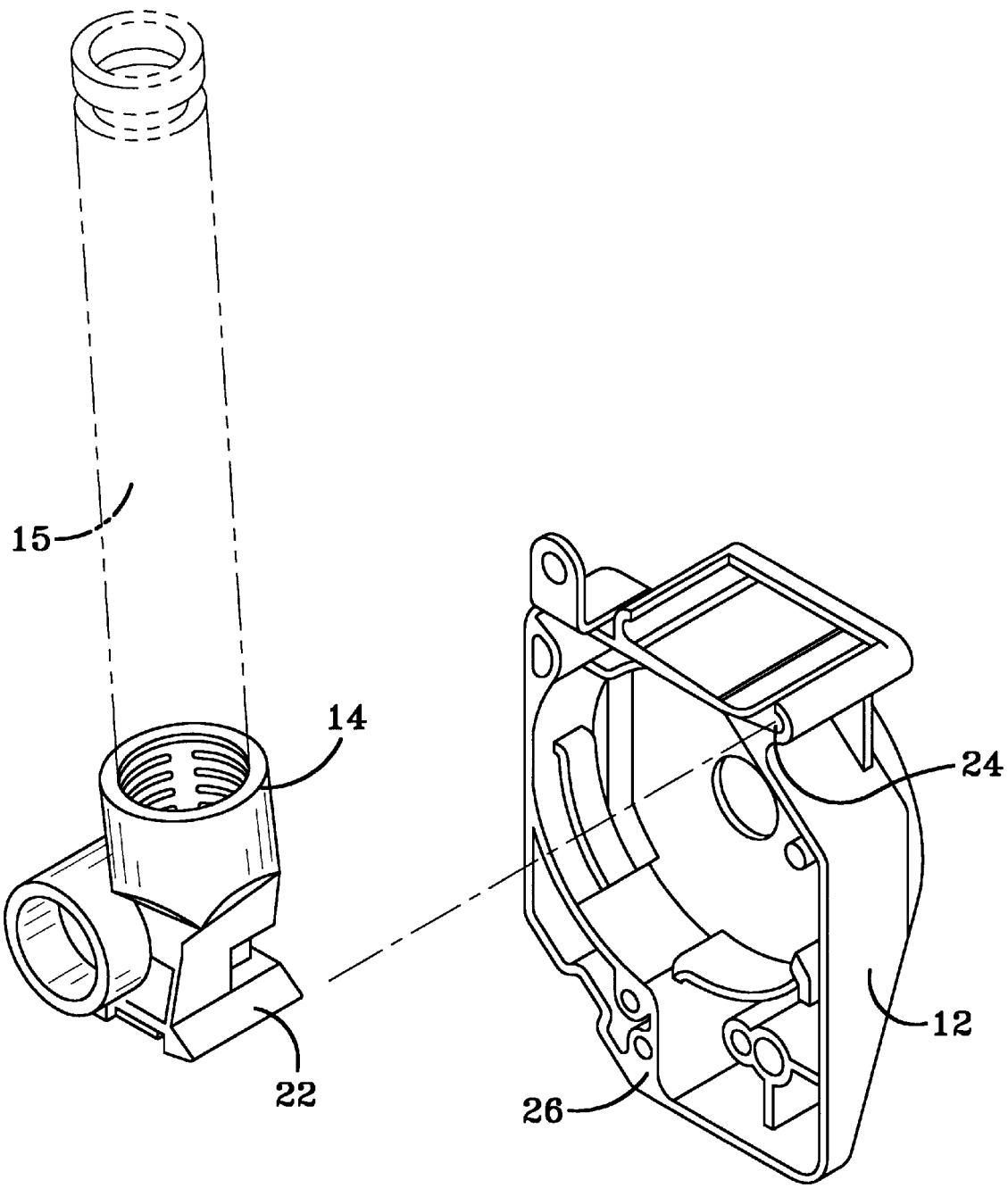
FIGS. 2A, 2B, 2C and 2D show clutch housings according to the present invention, with alternative pretensioner mounting parts.
Figure 2B:
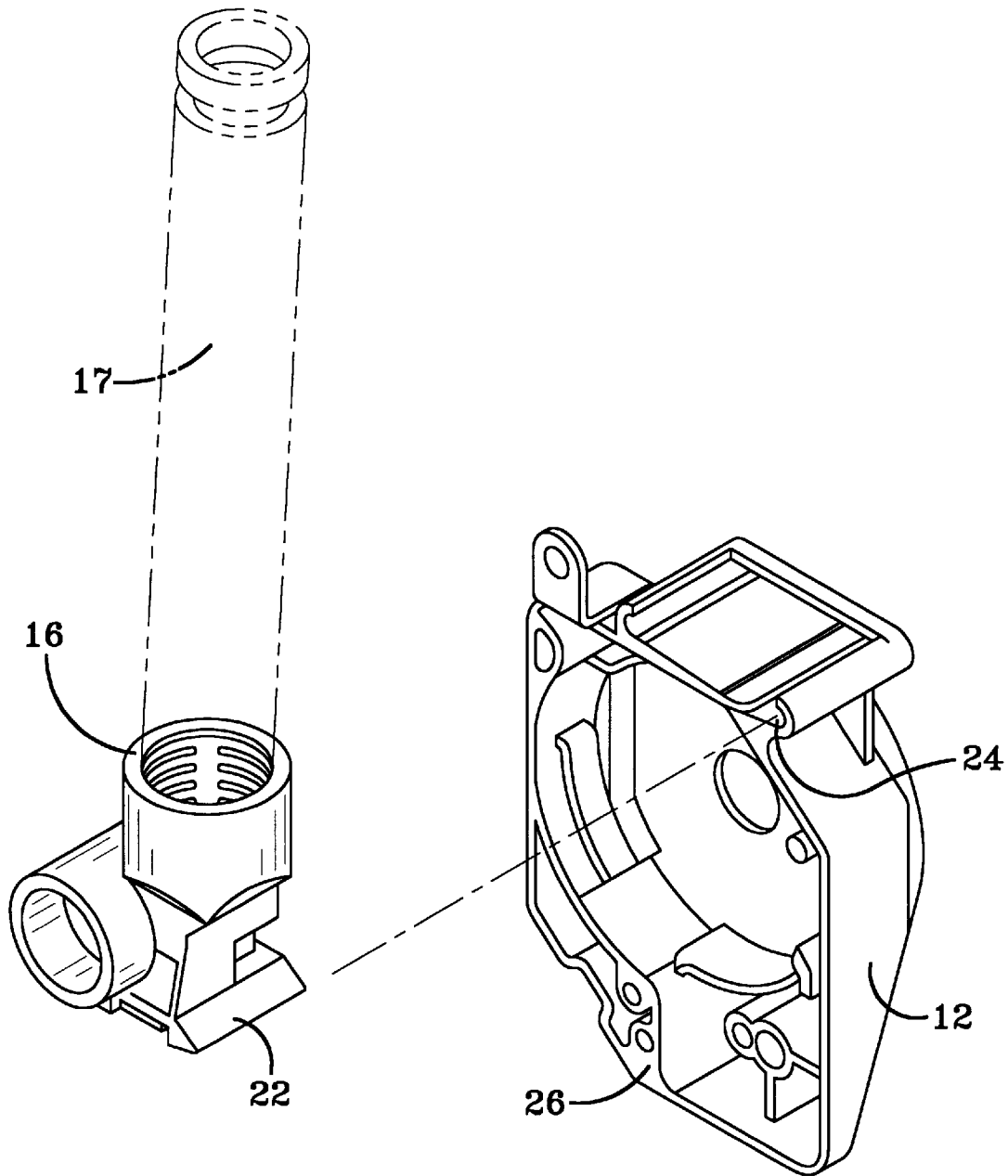
Figure 2C:
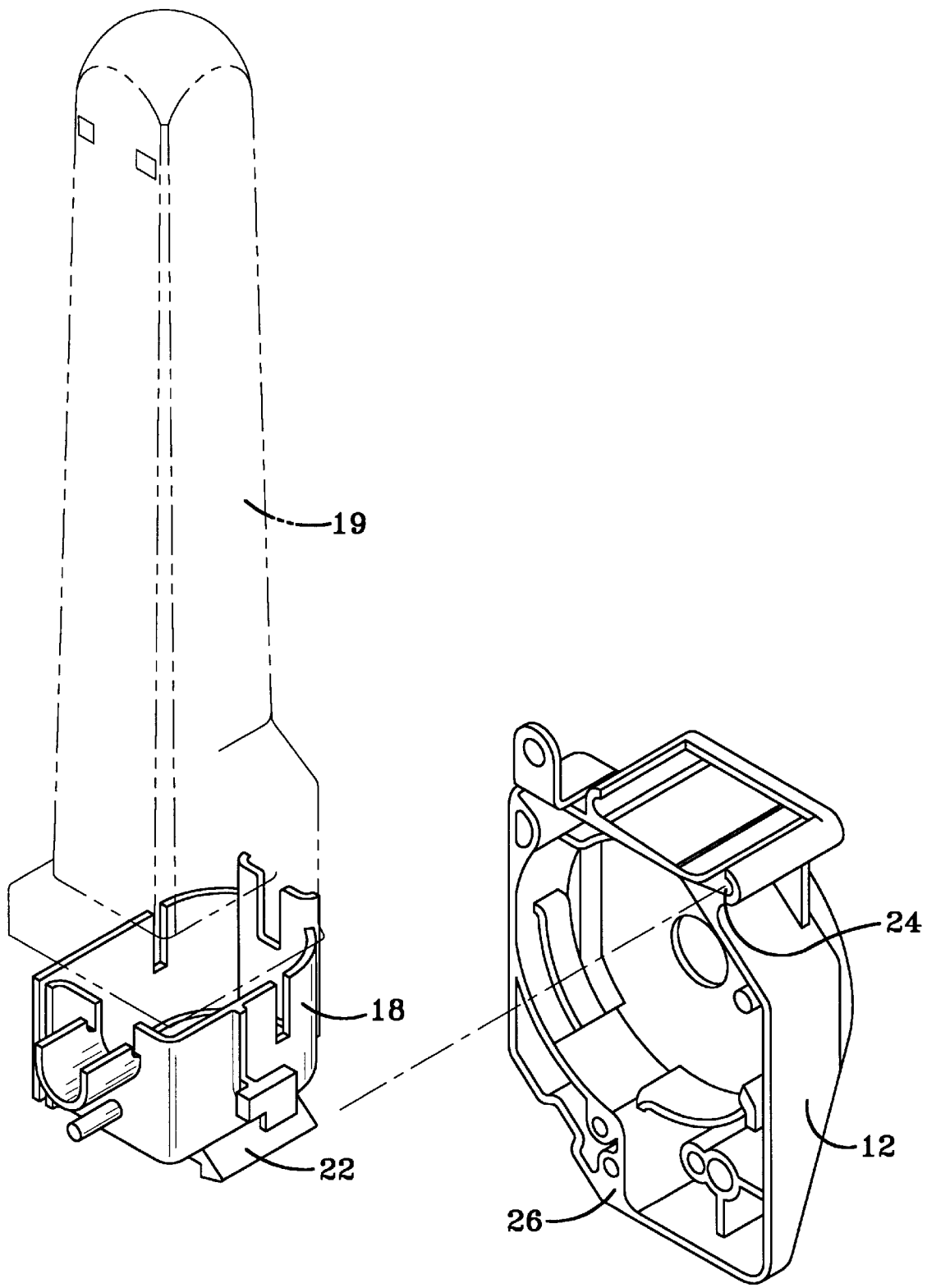
Figure 2D:
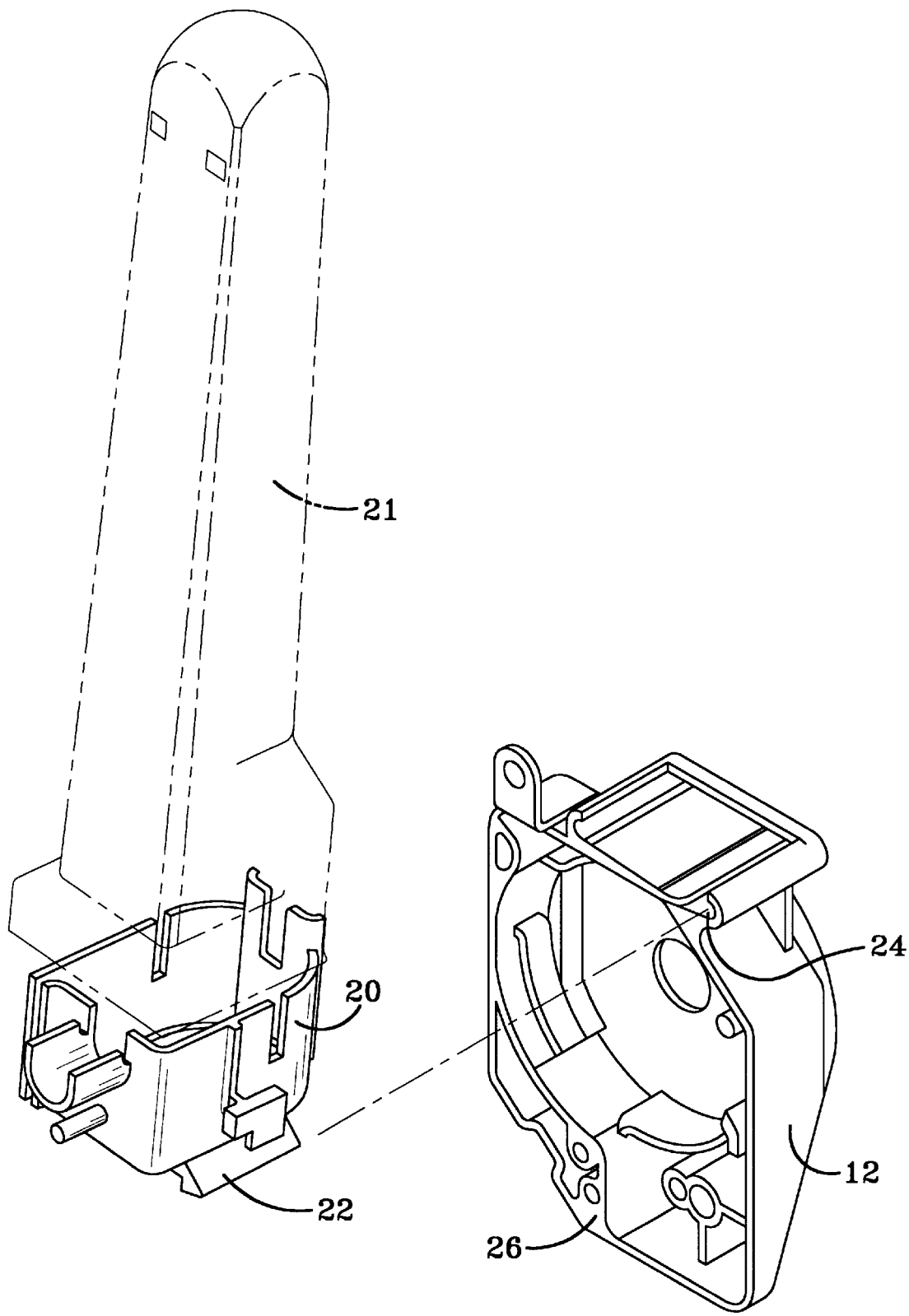

Referring to FIGS. 1A and 1B, a housing 2 according to the prior art comprises a pretensioner clutch housing part 4 integral with a pretensioner mounting part 6. In FIG. 1A a housing 8 for a mechanically operated pretensioner is shown in phantom lines. In FIG. 1B a housing 10 for an electrically operated pretensioner is shown in broken lines. The pretensioner housing 8 or 10 is attached to the mounting part 6 of the housing 2. It is often required that the pretensioner housing 8, 10 extend at a different angle, for example to fit a different car model, and for this it is necessary to provide a complete housing 2 having a different configuration, with the pretensioner mounting part 6 extending at a different angle from the clutch housing part 4. This leads to high production costs.

Referring now to FIGS. 2A, 2B, 2C and 2D, according to the present invention, the housing 2 is divided into two separate parts; the first part 12 for housing the clutch, and attaching to associated belt spool, and a second part 14, 16, 18 or 20 for mounting the pretensioner mechanism. The figures shows four alternative second housing parts 14, 16, 18 or 20. Two of these second housing parts 14, 16 are for mounting electrically operated pretensioners 15, 17 as shown in broken lines, each extending at a different angle. The remaining two alternative second housing parts 18 and 20 are for mechanically operated pretensioners 19, 21 shown in phantom lines, also extending at different angles.

Each second housing part 14, 16, 18 20 has a mounting member conveniently comprising a transversely extending flange 22, which is shaped so as to fit with a cooperating part of the first clutch housing part 12, conveniently comprising a transverse slot 24. The flanges 22 enable any one of the second housing parts to slide into the slot 24 in the first housing part 12 and thus the first housing part can be universal item for any type of pretensioner in almost any vehicle. While it is prefered that the cooperating members comprise a slot or groove on one part and a flange, slidable into the slot or groove, on the other part, various alternative arrangements are contemplated such as threaded fasteners, bolt fitments or clip-on fitments.

Since the pretensioner is mounted in this second separate housing part, this part can be interchangeable depending upon the required angle of extension of the pretensioner tube, while the clutch housing part remains the same. The clutch housing is a major part of the arrangement and its manufacture requires a more expensive tool, so the invention represents a substantial cost saving in production terms. Production costs are thus reduced. The open face 26 of the housing part 12 is then fitted to the spool housing (not shown) to secure the flange 22 in the slot 24.

While preferred embodiments of the invention have been disclosed, it should be appreciated that the invention is susceptible to modification without departing from the scope of the following claims.

I claim:

1. A pretensioner clutch housing for a vehicle seat belt arrangement comprising a first housing part arranged to mount a clutch, the first housing part comprises a slot or groove, and a second housing part arranged to mount a pre-tensioning device, the second housing part comprises a flange which is slidable into said slot or groove, said flange being shaped so as to fit with said slot or groove such that the second housing part is at a predetermined angle relative to the first housing part.

* * * * *